United States Patent [19]

Fujiwara et al.

[11] Patent Number: 4,803,578
[45] Date of Patent: Feb. 7, 1989

[54] ASSEMBLY FOR STABLY MOUNTING MAGNETIC HEAD ON CARRIAGE

[75] Inventors: Hideo Fujiwara; Akito Sakemoto; Osamu Inagoya, all of Ibaragi, Japan

[73] Assignee: Hitachi Maxell, Ltd., Osaka, Japan

[21] Appl. No.: 861,349

[22] Filed: May 9, 1986

[30] Foreign Application Priority Data

May 9, 1985 [JP] Japan .................. 60-96598

[51] Int. Cl.⁴ .................................. G11B 5/54
[52] U.S. Cl. .................... 360/105; 360/129; 360/103
[58] Field of Search .............. 360/104, 105, 109, 129, 360/122, 102, 103, 97, 99

[56] References Cited

U.S. PATENT DOCUMENTS 3,631,425 12/1971 Tang .................................. 360/103
4,605,977 8/1986 Matthews ...................... 360/102 X
4,611,257 9/1986 Shiroyama et al. ............ 360/99 X

FOREIGN PATENT DOCUMENTS 0130820 10/1981 Japan .................................. 360/103

Primary Examiner—Stuart N. Hecker
Assistant Examiner—Andrew L. Sniezek
Attorney, Agent, or Firm—Birch, Stewart, Kolasch & Birch

[57] ABSTRACT

In a magnetic head carriage assembly which includes a head carriage for mounting a magnetic head for slidably contacting with a rotating magnetic disc and a clamper for mounting a clamp shoe disposed to oppose the magnetic head and biased toward the head carriage, there is provided a pivot for confining the movement of the clamp shoe in a direction perpendicular to the direction of rotational plane of the magnetic disc and a cantilever spring for mounting the magnetic head on the carriage or clamper.

15 Claims, 6 Drawing Sheets

ASSEMBLY FOR STABLY MOUNTING MAGNETIC HEAD ON CARRIAGE

BACKGROUND OF THE INVENTION

1. Field of the Invention

The present invention relates to a magnetic head carriage assembly for use in a disc drive device for driving a floppy disc or the like.

2. Description of the Prior Art

As the density of the information written on a magnetic recording disc increases, an important problem has arisen in disc drive device, with regard to stabilizing head touch the contact between a recording head and a floppy disc. Another problem that has arisen concerns decreasing the spacing loss so as to obtain stabilized recording or reproducing signals of the magnetic recording disc.

The magnetic discs used for the magnetic disc drive device are usually produced by punching an original magnetic sheet which is wound in a roll, therefore the produced magnetic discs tend to be curled. The magnetic discs are enclosed in a disc cartridge case. When the disc cartridge containing such a curled magnetic disc is driven in the disc drive device, the magnetic disc is rotated with the peripheral portion of the disc fluttering vertically relative to the rotation plane of the disc, whereby the magnetic head contact with the magnetic disc is apt to be unstable.

Figure 1:
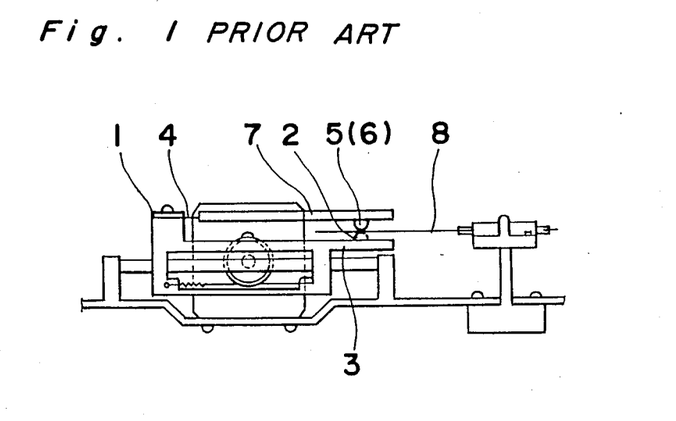
FIG. 1 is a front view of a conventional magnetic head carriage assembly.

In order to suppress the fluttering of the magnetic disc and to assure a good contact between the magnetic head of the disc drive and the magnetic disc, there has been employed a magnetic head carriage assembly as shown in FIG. 1. The conventional magnetic head carriage assembly 1 comprises a head carriage 3 carrying a magnetic head 2 and a clamper 7 carrying another magnetic head 5 or a pad 6 which faces to the magnetic head 2 and biased toward the head carriage 3 by means of a resilient plate 4. A magnetic disc 8 is rotatably clamped between the two magnetic heads 2 and 5 or the magnetic head 2 and the pad 6.

The magnetic head carriage assembly using the pad 6 is employed in the disc drive device for a one sided magnetic disc. To the contrary, the magnetic disc using the magnetic head 5 is employed in the disc drive device for a dual sided magnetic disc.

Figure 2:
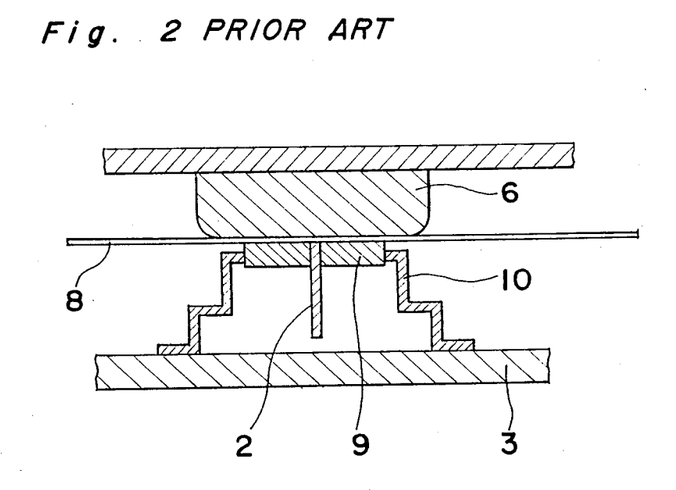
FIG. 2 is a cross sectional view showing an arrangement of a magnetic head and a pad used in the conventional magnetic head carriage assembly.

In the magnetic head carriage assembly for the one sided magnetic disc, conventionally the magnetic head 2 is secured on the head carriage 3 in such a manner that the magnetic head 2 is embedded in a slider 9 having a width greater than the width of the core of the magnetic head 2. The slider 9 is supported on a base 10 secured to the head carriage 3. The magnetic disc 8 is clamped between the top flat surface of the slider 9 the level of which is flush with the magnetic head 2 and the pad 6 made of molding of natural fibers or synthetic fibers having a suitable resiliency so that a magnetic gap of the magnetic head 2 can be contacted onto the recording surface of the magnetic disc 8. The bottom surface of the pad 6 has substantially the same flat shape of the top surface of the slider 9.

Figure 3:
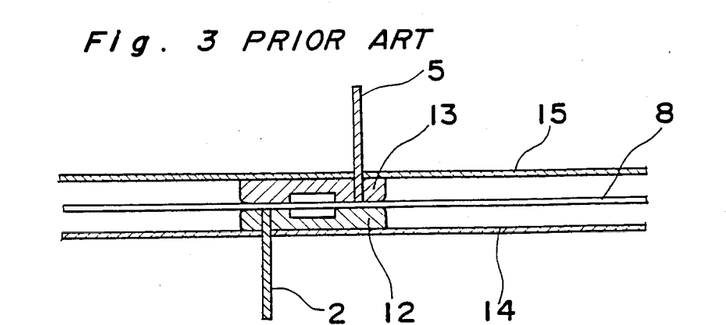
FIG. 3 is a cross sectional view showing another arrangement of magnetic heads used in the conventional magnetic head carriage assembly.

In the magnetic head carriage assembly for the dual sided magnetic disc, as shown in FIG. 3, the magnetic heads 2 and 5 are respectively embedded in the sliders 12 and 13 each having a width greater than the width of the magnetic head and being supported on gimbal spring assemblies 14 and 15 so as that the magnetic head 2 faces the slider 13 and the magnetic head 5 faces the slider 12. By clamping the magnetic disc 8 by the sliders 12 and 13, the magnetic disc 8 can be contacted to the magnetic gaps of the magnetic heads 2 and 5.

In the conventional magnetic head carriage assembly mentioned as above, fluttering of the magnetic disc can be suppressed to an extent by clamping the magnetic disc between two magnetic heads 2 and 5 or the magnetic head 2 and the pad 6. Also even if an angle of approach of the magnetic disc 8 to the magnetic head is changed, the magnetic head can follow the magnetic disc by resiliently supporting magnetic head by the gimbal springs 11, 14 and 15.

However, since the clamping force of the head carriage 3 and clamper 7 is set at about a few tons of grams to prevent undesired wearing of the magnetic head, in the case wherein the amount of curl of the magnetic disc is great, the force applied by the magnetic disc to the magnetic head is greater than the clamping force of the head carriage, so that the clamper jumps upward.

In the conventional magnetic head carriage assembly, the magnetic heads 2 and 5 are so arranged that the movement of the magnetic head in the vertical direction is confined. Thus when the clamper 7 jumps as mentioned above, the magnetic heads 2 and 5 can not follow the magnetic disc 8, thereby causing the magnetic heads 2 and 5 to be disengaged from the magnetic disc 8, resulting in drop out of signals or reduction of the output voltage.

This drawback mentioned above may be eliminated by mounting the magnetic heads 2 and 5 to be movable in the vertical direction on relative to the head carriage 3 and clamper 7. However, in the case wherein the magnetic heads 2 and 5 embedded in the sliders 9, 12 and 13 are mounted on the head carriage 3 and clamper 7, it is difficult to prevent the fluttering of the magnetic disc 8. In addition a great inertial force acts on the assembly of the magnetic heads 2 and 5 and the sliders 9, 12 and 13, and the magnetic heads 2 and 5 follow the magnetic disc 8 with difficulty, thereby causing the head touch to be unstable.

In the case wherein the magnetic heads are solely mounted on the clamper and head carriage without using the slider, the contacting area of the magnetic head with the magnetic disc may be remarkably decreased and the pressing force per unit area of the magnetic head onto the magnetic disc may be undesirably increased, thereby increasing the possibility of injuring the magnetic disc. If the force of supporting the magnetic head is decreased in order to avoid these problems, fluttering of the magnetic disc can not sufficiently be suppressed, thereby causing the head touch to be unstable.

SUMMARY OF THE INVENTION

An essential object of the present invention is to provide a magnetic head carriage assembly which is able to assure a good head touch so as to record and reproduce the information with a high stability and a high output.

For this purpose, according to the present invention there is provided a magnetic head carriage assembly comprising a head carriage for mounting a magnetic head for slidably contacting with a rotating magnetic disc and a clamper for mounting a clamp shoe disposed on the opposite side of the magnetic head relative to the magnetic disc and biased toward the head carriage, wherein the improvement comprises means for confining the movement of the clamp shoe in a direction perpendicular to the rotation plane of the magnetic disc and means for mounting the magnetic head on the carriage or the clamper through a resilient member.

BRIEF EXPLANATION OF THE DRAWINGS

FIG. 8 is a perspective view showing another clamp shoe used in the magnetic head carriage assembly shown in FIG. 4.

DETAILED DESCRIPTION OF THE PREFERRED EMBODIMENTS

Before the description proceeds, it is noted that like parts are designated by like reference numerals throughout the drawings.

Referring to FIGS. 4 to 10, reference numeral 20 is a magnetic head carriage assembly, 21 and 22 are clamp shoes, 23 is a magnetic head, 24 is a magnetic head supporting spring. Other parts are designated by the like reference numerals shown in FIGS. 1 to 3.

Figure 5:
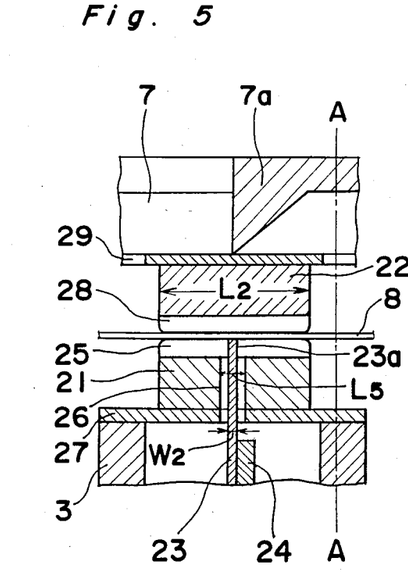
FIG. 5 is a cross sectional view showing an arrangement of the magnetic head and clamp shoe used in the magnetic head carriage assembly shown in FIG. 4.
Figure 6:
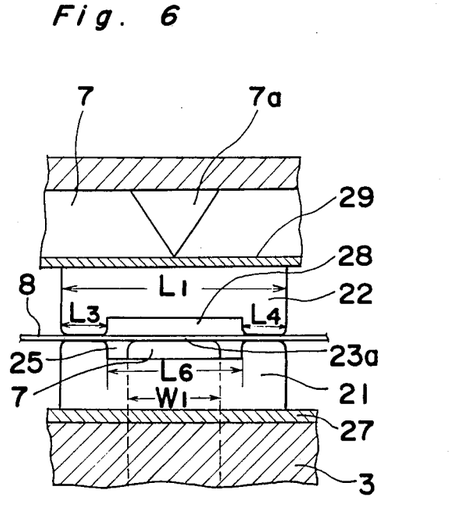
FIG. 6 is a cross sectional view taken along the lines A—A in FIG. 5, FIG. 7 a perspective view showing a clamp shoe used in the magnetic head carriage assembly shown in FIG. 4
Figures 7, 8:
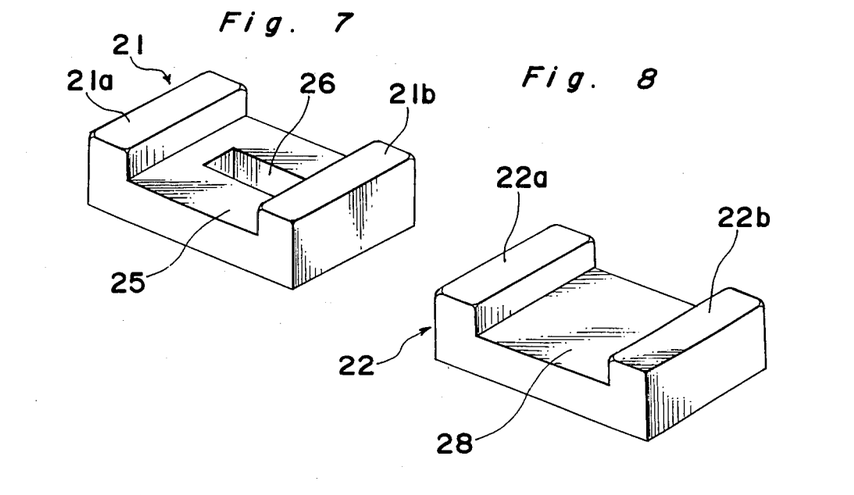

The clamp shoe 21 mounted on the carriage 3 is formed in a generally flat rectangular shape having sizes L1 of 8.0 mm and L2 of 6.0 mm which are larger than the sizes of the magnetic head 23 of W1 of 3.8 mm and W2 of 0.6 mm. A groove 25 is defined on the central portion of the upper surface of the clamp shoe 21 so as to form two sliding surfaces 21a and 21b on both sides of the groove 25. In one example the widths L3 and L4 of the sliding surfaces 21a and 21b are 1.5 mm. A head insertion hole 26 of a rectangular shape is defined through the sliding shoe 21 at the central portion of the groove 25. The head insertion hole 26 has the sizes of L5 of 1.00 mm and L6 of 4.5 mm. The clamp shoe 21 is secured to a mounting base 27 provided on the free end portion of the carriage 3 so that the groove 25 is directed perpendicular to the radius direction of the magnetic disc. 8.

Figure 9:
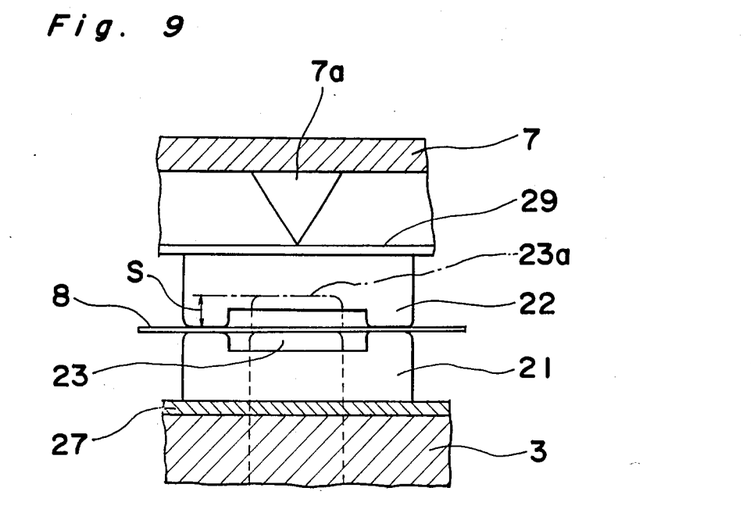
FIG. 9 is a partial cross sectional view showing a portion of mounting of the magnetic heads in the magnetic head carriage assembly shown in FIG. 4.

The clamp shoe 22 mounted on the clamper 7 is the same shape as the clamp shoe 21 except for that the head insertion hole 25 is not defined. A pair of sliding surfaces 22a and 22b are formed on both sides of a groove 28. The clamp shoe 22 is secured to a gimbal spring 29 suspended on the clamper 7 so that the groove 28 is directed perpendicular to the radius of the magnetic disc 8. A pivot 7a having a conical shape is formed integral with the clamper 7 so as to project downwardly for detachably engaging the sharpened end with the central portion of the top surface of the gimbal spring 29. By this arrangement, the pivot 7a acts to confine the movement of the clamp shoe 22 in a vertical direction against the surface of the magnetic disc.

As the materials of clamp shoes 21 and 22, various materials can be used so far as the sharpened edge does not injure the magnetic disc, and it is desired to use a hard material with having a suitable slidability such as ferrite for making the core of the magnetic head. For example there are used barium titanate, calcium titanate and zinc ferrite. In order to make the contact against the disc smooth, it is desired to supply to the contact surface of the clamp shoe solid lubricant such, as molybdenum disulfide, graphite, amoruphous carbon, teflon or fluid lubricant such as silicon oil, ester of fatty acid or fluorine oil by way coating or sintering.

It is desired to define the area of the sliding surfaces 21a, 21b, 22a and 22b almost equal to the area of the conventional slider in which the magnetic head is embeded to keep the sliding resistance unchanged. In case the pressure of the clamp shoe 22 is smaller than the pressure of the conventional clamp shoe, the area of the clamp shoe can be increased so that the same sliding resistivity is obtained.

Figure 4:
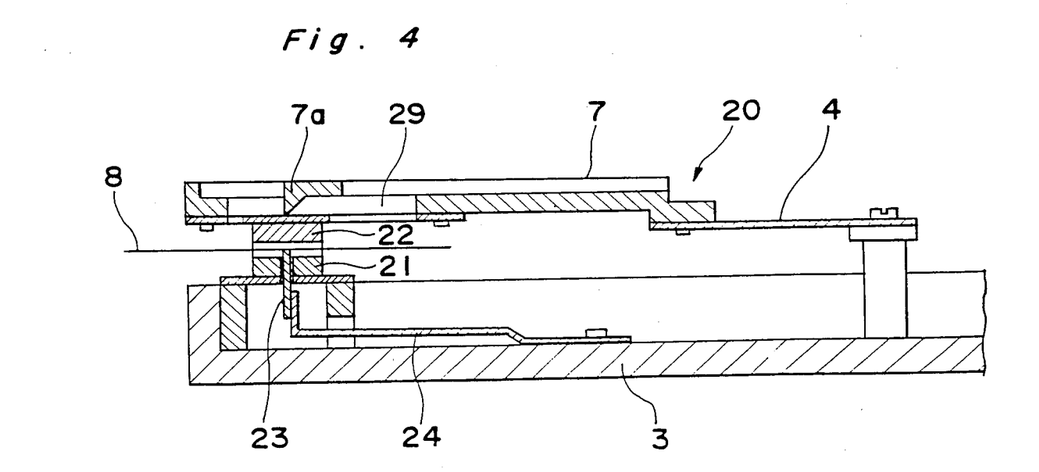
FIG. 4 is a cross sectional view showing an essential part of a preferred embodiment of a magnetic head carriage assembly according to the present invention.

According to the present invention the magnetic head 23 is solely disposed in position without slider or supporting member. The magnetic head 23 is mounted on the carriage 3 through a magnetic head mounting spring 24 so that a sliding surface 23a of the magnetic head 23 can be projected higher than the the sliding surfaces 21a and 21b of the clamp shoe 21 through the head insertion hole 26. In this arrangement, the step S between the sliding surface 23a of the magnetic head 23 and the sliding surfaces 21a, 21b of the clamp shoe 21 is set so that the pressure per unit area applied to the sliding surface 23a of the magnetic head 23 is in an allowable range in view of the abrasion resistance of the magnetic disc under such condition that the magnetic head 23 projected above the sliding surface is drawn to such a level that the contact surface 23a of the magnetic head 23 is flush with the contact surface of the clamp shoe 21 by the force applied from the magnetic disc 8.

The magnetic head 23 can be secured to the spring 24 by various conventional means such as bonding or mechanical means such as bolt. In any way however it is desired to interpose anti magnetizable material between the magnetic head 23 and the spring 24 for keeping a good magnetic characteristics of the magnetic head.

In the embodiment of the magnetic head carriage assembly mentioned above, since the magnetic disc 8 is clamped between the clamp shoes 21 and 22 which are mounted on the carriage 3 and clamper 7 each being confined with respect to their vertical movement, the fluttering of the magnetic disc can be effectively suppressed. Also since each of the clamp shoes 21 and 22 is provided with the grooves 25 and 28 at the central portion of the clamp shoes and the sliding surfaces 21a, 21b, 22a and 22b are formed on both sides of the grooves 25 and 28, in the case it is assumed that the total area of the sliding surfaces 21a, 21b, 22a and 22b is equal to the amount of the area of the sliding surface of the conventional slider, the length of the sliding surface of the clamp shoes 21 and 22 in the running direction of the magnetic disc 8 can be made longer than the length of the conventional slider. As a result, the magnetic disc 8 is pressed towards the magnetic head 23 at the position far away from the magnetic gap 23c of the magnetic head 23, so that the magnetic disc 8 can easily contact with the magnetic gap 23c. Thus the head contact can be improved. In addition, since the total amount of the sliding area of the sliding surfaces 21a, 21b, 22a and 22b are generally equal to the conventional slider, the sliding resistance of the magnetic disc is not increased. Furthermore, since the magnetic head 23 is supported by the spring 24 independent of the clamp shoe 21 so as resiliently to move in the direction perpendicular to the surface of the magnetic disc 8, the trackability of the magnetic head onto the magnetic disc can be improved. Thus even if the clamper 7 is sprung upward due to the fluttering of the magnetic disc 8, the head contact of the magnetic head 23 and the magnetic disc 8 can be assured.

In the experiments by the inventor, read-write characteristics of the magnetic head carriage assembly according to the present invention is measured using the carriage assembly comprising a metal-in gap head having a track width of 142 $\mu$m, head gap length 0.25 $\mu$m, contact force 3 g.f, and 10 g.f of contact force of the clamp shoe 21. Also 100 sheets of the metal floppy disc of coercive force of 1500 Oe and residual magnetic flux density of 1500 gauss were used. The modulation fault ratio was improved from 24% of the prior art shown in FIG. 3 to 6% in the present invention. The output of the linear recording density of 40 kfoci increased by 13%. The modulation including more than 10% was judged as the fault condition.

Figure 10:
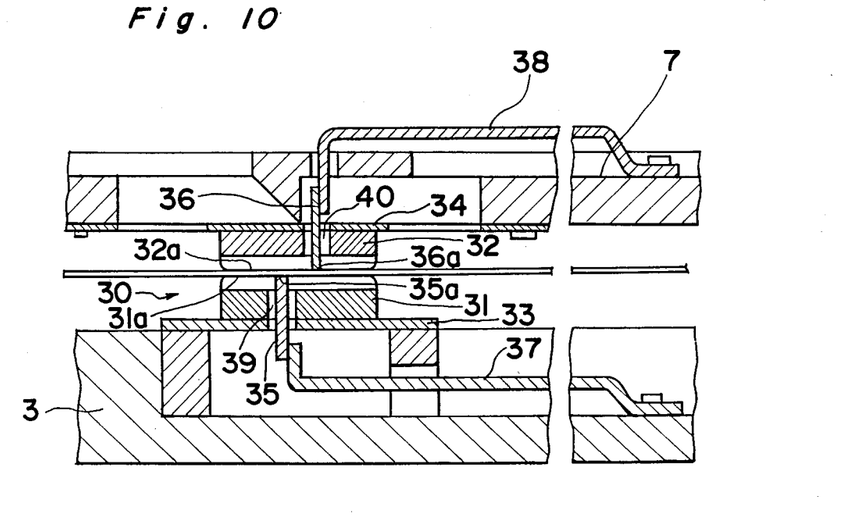
FIG. 10 is a cross sectional view showing another embodiment of the magnetic head carriage assembly according to the present invention.

Another embodiment of the the present invention will be explained with reference to FIG. 10 showing a magnetic head carriage assembly for use in a dual sided recording device.

Referring to FIG. 10, reference numeral 30 shows a carriage assembly, 31 and 32 show clamp shoes respectively, 33 and 34 show gimbal springs, 35 and 36 show magnetic heads, 37 and 38 show magnetic head securing springs. The gimbal springs are used to support the clamp shoe so as to be rotatable in the rotational direction of the disc for assuring a correct contact between the disc and the clamp shoe.

The clamp shoes 31 and 32 are respectively similar to the clamp shoe 21 shown in FIG. 4. The clamp shoe 31 is secured on the top surface of the gimbal spring 33 suspended on the top surface of the free end of the carriage 3. The clamp shoe 32 is secured on the bottom surface of the gimbal spring 34 suspended on the bottom face of the free end of the clamper 7.

The magnetic heads 35 and 36 are respectively similar to the magnetic head used in the embodiment shown in FIG. 4. Each magnetic head is composed of the magnetic head itself without using a slider or supporting member. The magnetic head 35 is supported on the carriage 3 by springs 37, having its sliding surface 35a passed through the head insertion hole 39 of the clamp shoe 31 so as to project in position higher than the top sliding surface 31a of the clamp shoe 31.

The magnetic head 36 is supported on the clamper 7 by springs 38, having its sliding surface 36a passed through the head insertion hole 40 of the clamp shoe 32 so as to project in position lower than the bottom sliding surface 32a of the clamp shoe 32.

The magnetic head carriage assembly shown in FIG. 10 can operate in the same manner as the magnetic head carriage assembly shown in FIG. 4.

It is noted that the essential construction of the magnetic head carriage assembly according to the present invention is in that the clamp shoe is so mounted at a position where the carriage and clamper opposes as to confine the movement of the clamp shoe in the direction perpendicular to the rotation plane of the magnetic disc, and one magnetic head is secured on at least any one of the carriage and clamper through a resilient member so that the sliding surface of the magnetic head can be in a level near the sliding surface of the clamp shoe. Therefore, the material, shape, position of the clamp shoe, the material, shape of the spring for supporting the magnetic head and means for connecting the magnetic head and the spring may be selected as desired and not limited those described herein.

In the embodiments mentioned above, the magnetic head of a simple substance is used, however the magnetic head having a magnetic head core protected by a slider 13 as shown in FIG. 3 may be used.

Although in the embodiment mentioned above, the sliding surfaces 21a and 21b of the clamp shoe 21 is so arranged as to slidably press the magnetic disc at both frontward and rearward positions relative to the magnetic head carriage 3, it is not essential to provide the sliding surface in the rearward position against the direction of rotation of the magnetic disc. However, to provide the sliding surfaces on both frontward and rearward position is effective to improve the stability of the head contact.

Figure 11:
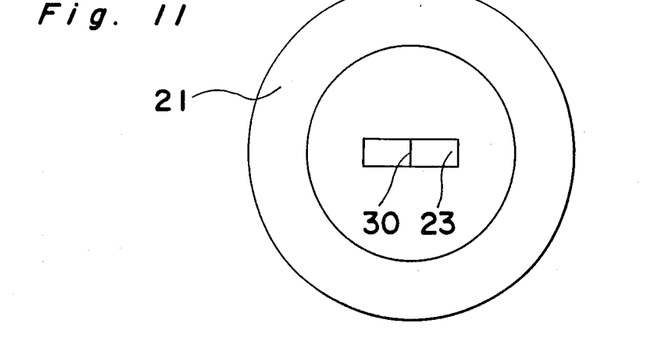
FIG. 11 is a plan view showing an essential part of a further embodiment of the magnetic head carriage assembly according to the present invention.
Figure 12:
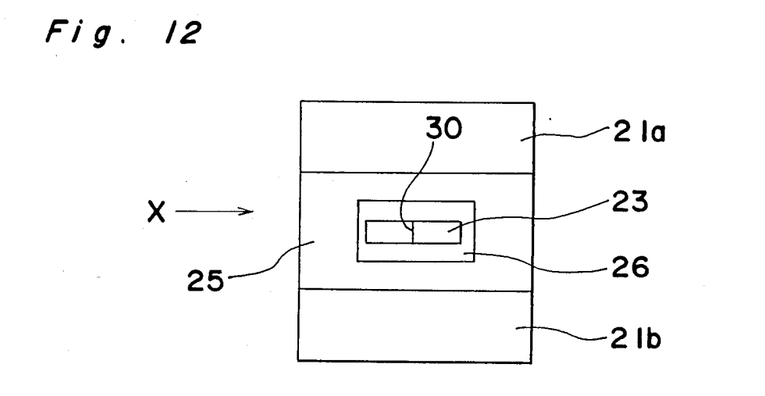
FIG. 12 is a plan view showing an essential part of a further embodiment of the magnetic head carriage assembly according to the present invention.
Figure 13:
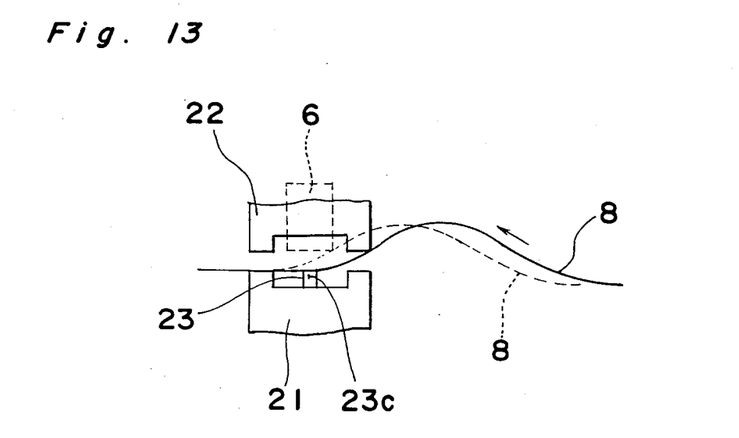
FIG. 13 is a side view showing an operation of the magnetic head carriage assembly shown in FIG. 4, and FIG. 14 through 22 respectively show various modification of the slider used in the magnetic head carriage assembly according to the present invention.
Figure 14:
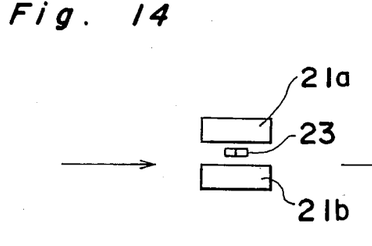
Figure 15:
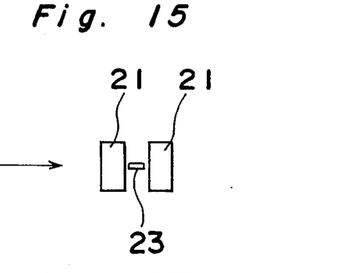

The clamp shoe 21 may be made in an annular shape as shown in FIG. 11 with the outer diameter of the clamp shoe 21 to be 6.0 mm, inner diameter 4.5 mm. In this case, the magnetic head carriage 8 of 3.8 mm length and 0.6 mm width may be disposed at the central portion of the clamp shoe 21 so that the magnetic head carriage can be projected or retracted from the surface of the clamp shoe 21. In FIG. 11, 30 shows a magnetic gap of the magnetic head 23. The shape of the clamp shoe may be an elliptical shape. Also, the clamp shoe 21 shown in FIG. 12 may be used in such a manner that the sliding surfaces 21a and 21b are directed parallel to the direction X of rotation of the magnetic disc.

Figure 16:
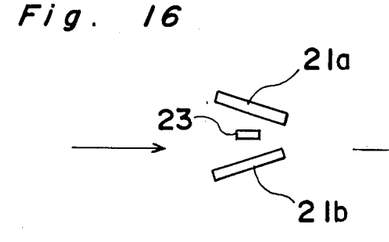
Figure 17:
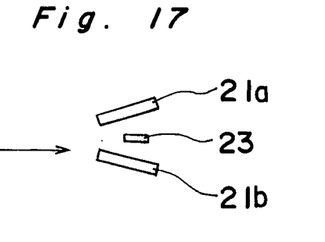

Various modifications of the arrangement of the clamp shoe 21 are shown in FIGS. 14 to 22. In FIG. 16, the sliding surfaces 21a and 21b of the clamp shoe 21 are slanted on both sides of the magnetic head 23 so that two sliding surfaces 21a and 21b are closer at the lower stream of the disc rotation than the upper stream. In FIG. 17, the sliding surfaces 21a and 21b of the clamp shoe 21 are slanted on both sides of the magnetic head 23 so that two sliding surfaces 21a and 21b are closer at the upper stream of the disc rotation than at the lower stream.

Figure 18:
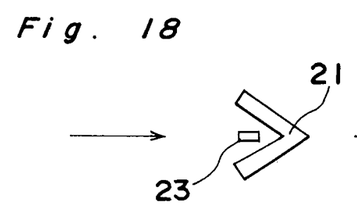
Figure 19:
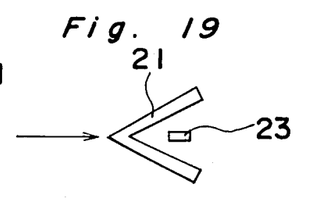
Figure 20:
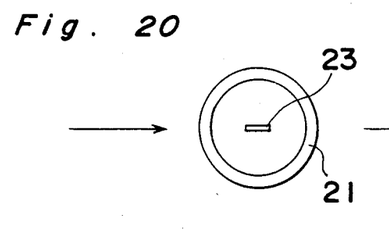

In FIGS. 18 and 19 the clamp shoe 21 is formed in the form of a V shape.

Figure 21:
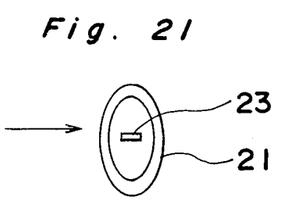

In FIG. 21, the clamp shoe 21 having an elliptical shape is used with its short axis directed to the direction of rotation of the magnetic disc.

Figure 22:
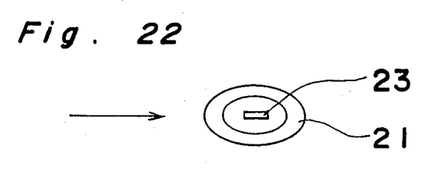

In FIG. 22, the clamp shoe 21 having an elliptical shape is used with its long axis directed to the direction of rotation of the magnetic disc.

It is one advantage of the magnetic head carriage assembly according to the present invention that since the clamp shoe is so mounted to the carriage assembly that the movement of the clamp shoe in the direction perpendicular to the direction of rotation of the magnetic disc is confined, the fluttering of the magnetic disc can be suppressed.

It is another advantage of the magnetic head carriage assembly according to the present invention that since the magnetic head can be moved in the direction perpendicular to the rotation plane of the magnetic disc, the trackability of the head to the magnetic disc in terms of the direction perpendicular to the rotation plane of the magnetic disc can be improved and even if the clamper is sprung up against the resilient force of the spring member supporting the clamper, contact between the magnetic disc and the magnetic head can be assured, resulting in a good head touch.

What is claimed is:

1. A magnetic head carriage assembly for use with a magnetic disc having a single recording side which comprises:
    a head carriage for slidably receiving a rotatable magnetic disc;
    a clamper resiliently mounted on said head carriage and biased toward said head carriage so that said magnetic disc rotates between said clamper and said head carriage;
    a first clamp shoe resilient member mounted on said clamper;
    first clamp shoe means resiliently mounted on said clamp shoe resilient member for contacting said magnetic disc, wherein the movement of said first clamp shoe means is confined to a direction perpendicular to the rotational plane of said magnetic disc, and wherein said first clamp shoe means is biased to oppose said head carriage;
    a second clamp shoe resilient member mounted on said head carriage;
    a second clamp shoe means resiliently mounted on said second clamp shoe resilient member for contacting said magnetic disc, wherein said second clamp shoe means is biased to oppose said first clamp shoe means;
    a head support resilient member mounted on said head carriage; and
    a magnetic head resiliently mounted on said head support resilient member for contacting said recording side of said magnetic disc, said magnetic head being biased so as to oppose said first clamp shoe means and being inserted through an insertion opening formed in said second clamp shoe means whereas said magnetic head is mounted such that is moves independent of movement of each of said clamp shoe means.

2. The magnetic head carriage assembly according to claim 1, wherein said magnetic head is biased to oppose said first clamp shoe means with a force that is smaller than an opposing force with which said first clamp shoe means is biased toward the magnetic disc.

3. The magnetic head carriage assembly according to claim 1, wherein said clamper includes a pivot portion for detachably engaging said first clamp shoe resilient member and for confining the movement of said first clamp shoe means to a direction perpendicular to the rotation plane of said magnetic disc.

4. The magnetic head carriage assembly according to claim 2, wherein said head support resilient member is a cantilever spring.

5. The magnetic head carriage assembly according to claim 4, wherein said clamp shoe resilient member mounted on said clamper is a gimal spring and said pivot portion has a conical shape the vertex of which detachably engages said gimbal spring.

6. The magnetic head carriage assembly according to claim 5, wherein said first clamp shoe means comprises a rectangular-shaped central portion including an upper surface adjacent to said first clamp shoe resilient member, and a lower surface having a groove formed therein so as to form two parallel first clamp shoe leg portions along two sides of said lower surface in a direction parallel to the radial direction of said magnetic disc, said first clamp shoe leg portions defining first and second sliding surfaces for slidably contacting said magnetic disc.

7. The magnetic carriage assembly according to claim 6, wherein said second clamp shoe means comprises a rectangular-shaped central portion including a lower surface adjacent to said head carriage, and an upper surface having a groove formed therein so as to form two parallel second clamp shoe leg portions along two sides of said upper surface in a direction parallel to the radial direction of said magnetic disc, said second clamp shoe leg portions defining third and fourth sliding surfaces for slidably contacting said magnetic disc, and wherein said head insertion opening is formed to be elongated in a direction perpendicular to the radial direction of said magnetic disc.

8. The magnetic carriage assembly according to claim 5, wherein
    said first clamp shoe means comprises a circular-shaped first central portion including an upper surface adjacent to said first clamp shoe resilient member, and a lower surface having first annular-shaped portion formed along the outer edge of said first central portion, said first annular-shaped portion defining a first surface for contacting said magnetic disc, and wherein
    said second clamp shoe means comprises a circular-shaped second central portion including a lower surface adjacent to said head carriage and an upper surface having a second annular-shaped portion formed along the outer edge of said second central portion, said second annular-shaped portion defining a second surface for contacting said magnetic disc.

9. A magnetic head carriage assembly for use with a magnetic disc having dual recording sides which comprises:
    a head carriage for slidably receiving a rotatable magnetic disc;
    a clamper resiliently mounted on said head carriage and biased toward said head carriage so that said magnetic disc rotates between said clamper and said head carriage;
    a first clamp shoe resilient member mounted on said clamper;
    a first clamp shoe means resiliently mounted on said first clamp shoe resilient member for contacting said magnetic disc, wherein the movement of said first clamp shoe means is confined to a direction perpendicular to the rotational plane of said magnetic disc, and wherein said first clamp shoe means is biased to oppose said head carriage;

a first head support resilient member mounted on said clamper;

a first magnetic head resiliently mounted on said first head support resilient member for contacting said magnetic disc, said first magnetic head being biased to oppose said head carriage and said first magnetic head being insertable through a first head insertion opening formed in said first clamp shoe means;

a second clamp shoe resilient member mounted on said head carriage;

a second clamp shoe means resiliently mounted on said second clamp shoe resilient member for contacting said magnetic disc, wherein said second clamp shoe means is biased to oppose said first clamp shoe means;

a second head support resilient member mounted on said head carriage; and a second magnetic head resiliently mounted on said second head resilient member for contacting said magnetic disc, said second magnetic head being biased to oppose said clamper and said second magnetic head being insertable through a second head insertion opening formed in said second clamp shoe means whereas each of said magnetic heads is mounted such that is moves independent of movement of each of said clamp shoe means.

10. The magnetic carriage assembly according to claim 9, wherein said clamper includes a pivot portion for detachably engaging said first clamp shoe resilient member with the magnetic disc and for confining the movement of said first clamp shoe means to a direction perpendicular to the rotational plane of said magnetic disc.

11. The magnetic carriage assembly according to claim 10, wherein said first and second head support resilient members are cantilever springs.

12. The magnetic head carriage assembly according to claim 11, wherein said first and second clamp shoe resilient members are first and second gimbal springs, respectively, and said pivot portion has a conical shape the vertex of which detachably engages said first gimbal spring.

13. The magnetic head carriage assembly according to claim 12, wherein said first clamp shoe means comprises a rectangular-shaped central portion including an upper surface adjacent to said first clamp shoe resilient member, and a lower surface having a groove formed therein so as to form two parallel first clamp shoe leg portions along two sides of said lower surface in a direction parallel to the radial direction of said magnetic disc, said first clamp shoe leg portions defining first and second sliding surfaces for slidably contacting said magnetic disc, and wherein said first head insertion opening is formed to be elongated in a direction perpendicular to the radial direction of said magnetic disc.

14. The magnetic carriage assembly according to claim 13, wherein said second clamp shoe means comprises a rectangular-shaped central portion including a lower surface adjacent to said second head support resilient member, and an upper surface having a groove formed therein so as to form two parallel second clamp shoe leg portions along two sides of said upper surface in a direction parallel to the radial direction of said magnetic disc, said second clamp shoe leg portions defining third and fourth sliding surfaces for slidably contacting said magnetic disc, and wherein said second head insertion hold is formed to be elongated in a direction perpendicular to the radial direction of said magnetic disc.

15. The magnetic carriage assembly according to claim 12, wherein said first clamp shoe means comprises a circular-shaped first central portion including an upper surface adjacent to said first clamp shoe resilient member, and a lower surface having a first annular-shaped portion formed along the outer edge of said first central portion, said first annular-shaped portion defining a first surface for contacting said magnetic disc, and wherein said second clamp shoe means comprises a circular-shaped second central portion including a lower surface adjacent to said second head support resilient member and an upper surface having a second annular-shaped portion formed along the outer edge of said second central portion, said second annular-shaped portion defining a second surface for contacting said magnetic disc.

* * * * *